March 1, 1966     B. STEVERDING     3,237,402

VARIABLE THRUST NOZZLE

Filed Nov. 14, 1963

Bernard Steverding,
*INVENTOR.*

BY Harry M. Saragovitz
Edward J. Kelly
Herbert Berl
James E. Staudt

United States Patent Office 3,237,402
Patented Mar. 1, 1966

3,237,402
VARIABLE THRUST NOZZLE
Bernard Steverding, Huntsville, Ala., assignor to the United States of America as represented by the Secretary of the Army
Filed Nov. 14, 1963, Ser. No. 323,861
4 Claims. (Cl. 60—35.6)
(Granted under Title 35, U.S. Code (1952), sec. 266)

The invention described herein may be manufactured and used by or for the Government for governmental purposes without the payment of any royalty thereon.

The present invention relates to a device for maintaining optimum thrust nozzle performance under varying conditions of outside pressure encountered in and out of the atmosphere. The efficiency of a typical convergent-divergent rocket nozzle is dependent upon the relationship between the exit area of a nozzle and the pressure of the atmosphere in which it is operating. In the ascending phase of a missile flight the atmospheric pressure changes rapidly. Thus, a nozzle having a fixed exit area will operate at optimum conditions for a brief period only. Many devices have been utilized in the past to control the exit area in the divergent portion of a nozzle. These devices have included complex and undependable linkages as well as intricate and delicate electronic mechanisms, all of which have proved to be relatively expensive and undependable. The present invention provides an economical device which controls the exit area of a nozzle by the use of removable ring-shaped ramps which are ejected at predetermined times thereby increasing the exit area of the nozzle to the size of the ramp next in line. Removal of a ramp is effected by the use of explosive bolts which are ignited at a predetermined time after the missile is fired. Ignition of the explosive bolts occurs when the bolts themselves or thermostatic firing mechanisms attached to the bolts reach a predetermined temperature. Erosion of the inner surface of a ramp causes the temperature of the bolts or their firing mechanism to rise gradually to the point at which the bolts will ignite, thus disconnecting the ramp and allowing the nozzle exhaust flow to expand to the area of the ramp next in line. The power of the bolts may be increased to the point at which they will cause disintegration of the ramps thus eliminating the possibility of an incomplete disconnection of the ramp.

Accordingly, one object of this invention is to vary the exit area of a thrust nozzle at a predetermined time thereby adjusting the pressure in the thrust nozzle to compensate for the varying pressures in the surrounding atmosphere.

Another object of my invention is to provide a thrust nozzle with removable rings wherein the rings are ejected in response to erosion of the ring itself.

Yet another object is to provide a variable area thrust nozzle wherein the original exhaust surfaces are removed during operation by the use of explosive bolts.

A further object of my invention is to provide a variable area nozzle which is simple in operation and yet dependable.

Other features of my invention will become apparent in accordance with the following description hereof with reference to the accompanying drawings, given merely by way of example, and in which.

Figure 1:
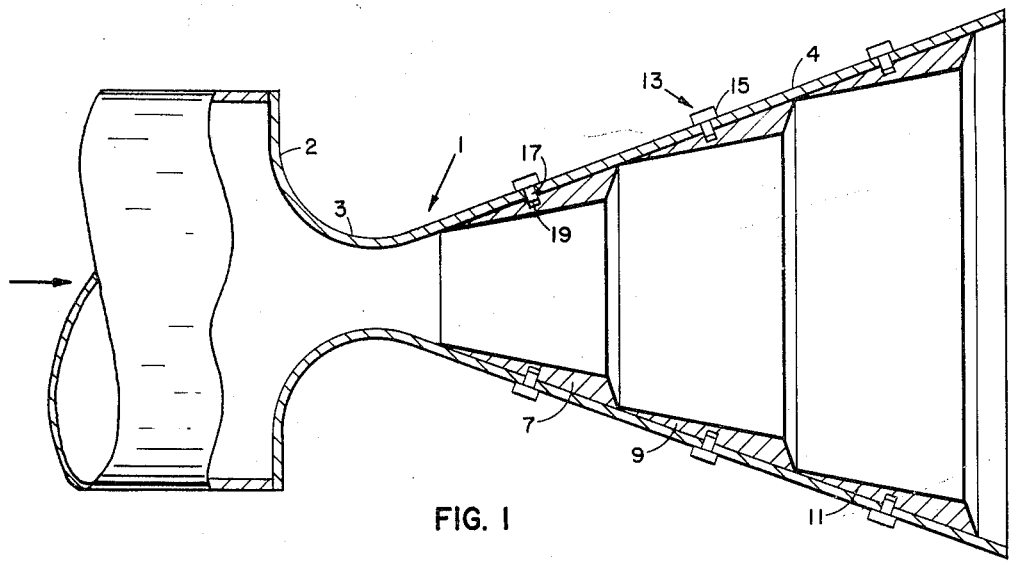
FIGURE 1 is a partial section illustrating a nozzle configuration and the location of removable ramps therein.
Figure 2:
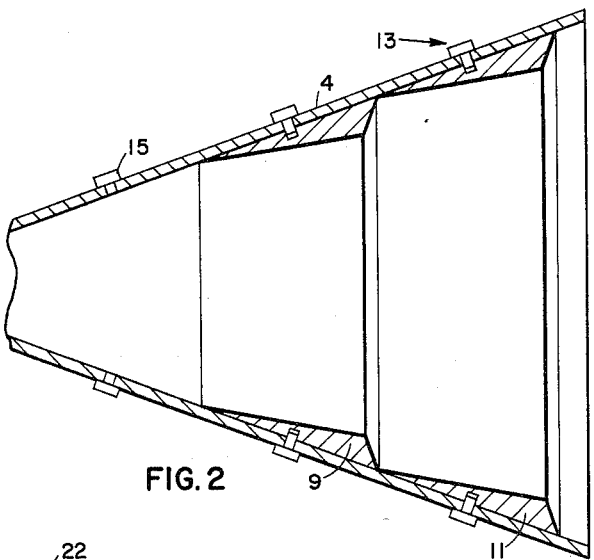
FIGURE 2 is a partial section similar to FIGURE 1 showing a nozzle after its forward ramp has been ejected.

Referring now to FIGURE 1 it will be seen that nozzle 1 consists of a convergent portion 2, a throat portion 3 and a divergent portion 4. Within the divergent portion of the nozzle are located a series of ring-shaped ramps 7, 9 and 11 of varying inner and outer diameters sequentially located from front to rear as their sizes increase, said ramps being disposed with the rearward end of the forward ramp contiguous the forward end of the ramp immediately to the rear thereof. As depicted in the drawing, the cross-sectional area of each ramp varies increasingly from the forward to the rearward end thereof. Thus, each ramp has a thin edge at its forward end in abutting engagement with divergent portion 4 and a thicker rearward end wherein the diameter of the inner surface of the ramp is relatively smaller than the diameter of the outer surface thereof, and wherein the outer surface of each ramp conforms to the divergent portion. These ramps may be made of ablative materials such as graphite or, dependent upon the rate of erosion required, of any refractory material which will erode at the desired rate. The ramps are held in place by explosive bolts 13 each of which comprises a head 15, a stem 17, and an igniter 19. A portion of the stems of these bolts is designed to explode when the igniter reaches a predetermined temperature. The head and part of the stem portion of each of these bolts are designed to remain in the nozzle to prevent loss of nozzle pressure which would occur if the bolts were blown completely out of the nozzle wall. Thus, as illustrated in FIGURE 2, after ejection of the forward ramp a smooth surface remains on the divergent portion of the nozzle and the exhaust flow is then confined by the second ramp.

Figure 3:
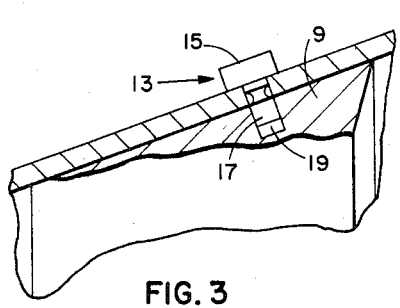
FIGURE 3 is an enlarged section showing in more detail the configuration of a partially eroded ramp and an explosive bolt.

The details of the explosive bolt are best illustrated in FIGURE 3. Erosion of the ramp 9 is also indicated in the enlarged section shown in FIGURE 3.

Figure 4:
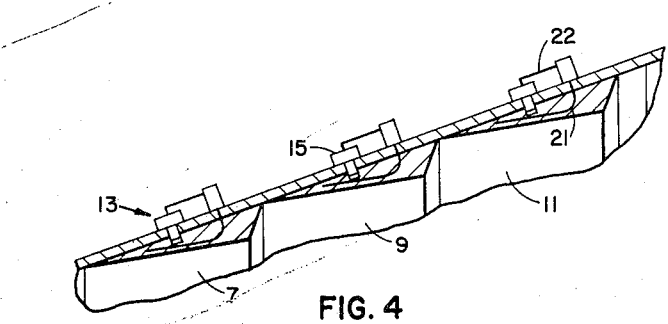
FIGURE 4 is a partial section illustrating thermostatic ignitor systems attached to the ramps.

In some instances the explosive bolts may not operate at exactly the same time thus causing misalignment of the ramp. A misaligned ramp could cause deflection of the nozzle thrust and if prolonged could drastically affect the accuracy of the missile. To insure simultaneous firing of the bolts, an ignitor system such as that illustrated in FIGURE 4 may be utilized. This system is provided with heat sensing probes 21 which relay the ramp temperature to a temperature control box 22 which in turn is electrically connected to the ignitor of the explosive bolts of one ramp. Thus, when the ramp reaches a predetermined temperature the bolts are exploded in unison by an electrical charge emitted from the temperature control box. Such a system may also be actuated in response to a signal from outside the missile thus providing an effective means of controlling the range of the missile from the ground after launching.

In operation, exhaust gases flow through the nozzle in the direction of the arrow indicated in FIGURE 1. The gases enter convergent portion 2, pass through throat 3, and exhaust through divergent portion 4. As pointed out above it is desirable to vary the cross-sectional exit area of the nozzle as the pressure of the atmosphere outside of the nozzle varies so as to achieve optimum thrust at a given atmospheric pressure. In the early moments of firing of a missile the atmospheric pressure is at a maximum, therefore requiring a minimum exhaust area in the divergent or exhaust portion of the thrust nozzle. Thus, the ringed-shaped ramp 7 which is located in the forward portion of the divergent section of the nozzle has an interior diameter less than that of the ramps to the rear thereof. As the missile passes through the area of high pressure the refractory material from which the ramp is made will erode gradually to the point that the temperature of the ignitors on the bolts or the ignitor system will explode the bolts thereby permitting the ramp to be ejected through the rearward ramps 9 and 11. As the missile passes into an area of lesser pressure the ejection of ramp 7 will occur thus causing the exhaust gases to jump to the enlarged area of ramp 9, as illustrated in FIGURE 2. After a predetermined time ramp 9 will be ejected in a similar manner thus moving control of the exhaust gases in the exit area to the inner diameter of ramp 11 and so on through as many ramps as desired. It will be noted that each ramp may be of varying thickness so as to determine the time required before its ejection. Also the ramps may be made of materials which erode at a different rate thereby allowing even further control of the ejection time. It will be noted that a material which is not refractory may also be utilized in that its heat conducting characteristics may be controlled to provide a predetermined time lapse between launching and ignition of the explosive bolts. The characteristics of the explosive bolts or the ignitor systems are of great importance since the temperature at which the bolts are ignited as well as the nearness of the bolt ignitors or the sensing probes to the surface of the ramps will be of utmost importance in controlling the time between firing and ejection of the ramps.

While the foregoing is a description of the preferred embodiment the following claims are intended to include those modifications and variations that are within the spirit and scope of my invention.

I claim:
1. A variable thrust nozzle comprising:
   (a) a forward convergent portion, an intermediate throat portion, and a rearward divergent portion;
   (b) a plurality of ring-shaped ramps disposed concentrically within said divergent portion and arranged sequentially from front to rear thereof with the rearward end of the forward ramp contiguous the forward end of the ramp immediately to the rear thereof;
   (c) each of said ramps having a thin, forward edge in abutting engagement with said divergent portion;
   (d) each of said ramps having varying inner and outer diameters thereby defining an outer divergent surface conforming to the divergent nozzle portion and an inner divergent surface, the diameters of said surfaces being substantially equal at said forward, thin edge while the diameter of the inner surface is relatively smaller than that of the outer surface at the rearward end thereof, the outer diameter of each said forward ramp being smaller than the inner diameter of the ramp immediately to the rear thereof; and
   (e) means carried by said divergent nozzle portion for attaching each ramp thereto at a position intermediate the ends of said ramp.

2. A variable thrust nozzle as defined in claim 1 wherein said means for attaching the ramps includes:
   (a) explosive bolts extending through said divergent nozzle portion with the inner end thereof extending a predetermined distance into each ramp at a position intermediate the forward and rearward ends thereof; and
   (b) igniter means located inwardly of the inner ends of said bolts for causing ignition thereof so as to release said ramps at a predetermined time.

3. A variable thrust nozzle as defined in claim 2 wherein the igniter means includes:
   (a) a thermally-responsive probe disposed within each said ramp between the inner end of each of said bolts and the inner surface of each ramp; and
   (b) a control system interconnecting the probes and bolts of each respective ramp whereby the explosive bolts of said ramp may be ignited in unison.

4. A variable thrust nozzle as defined in claim 3 wherein the ramps are made of ablative material.

References Cited by the Examiner
UNITED STATES PATENTS

| | | | |
|---|---|---|---|
| 2,206,057 | 7/1940 | Skinner | 60—35.6 |
| 3,052,090 | 9/1962 | Herzog | 60—35.6 |
| 3,070,014 | 12/1962 | Gose | 102—49 |
| 3,079,752 | 3/1963 | Thielman | 60—35.6 |

MARK NEWMAN, *Primary Examiner.*

RALPH D. BLAKESLEE, *Examiner.*